Jan. 31, 1933.  E. W. LITTLE  1,895,577
AUTOMATIC WELDING MACHINE
Filed March 31, 1930  8 Sheets-Sheet 1
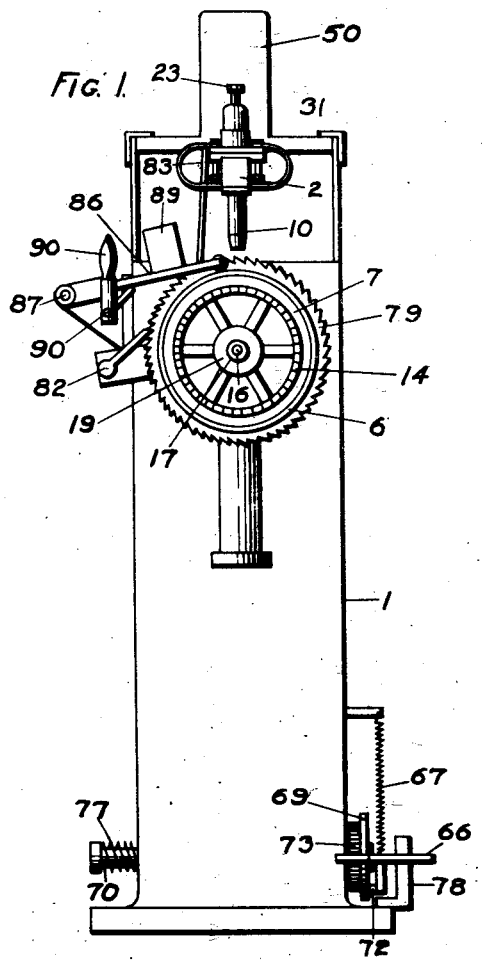
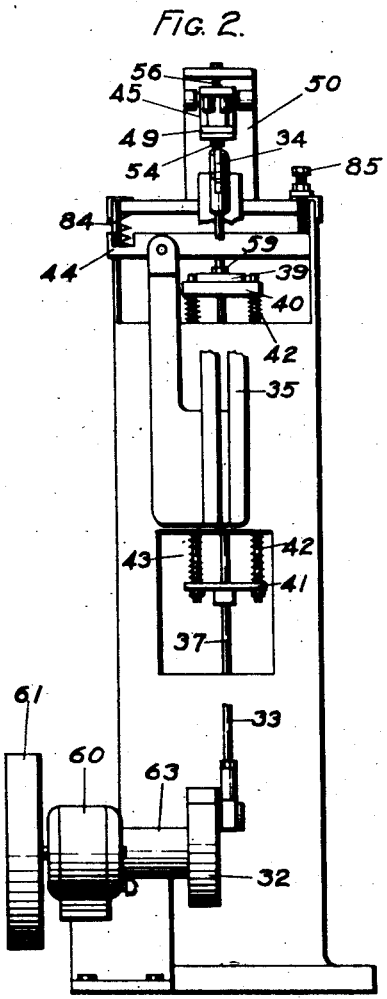
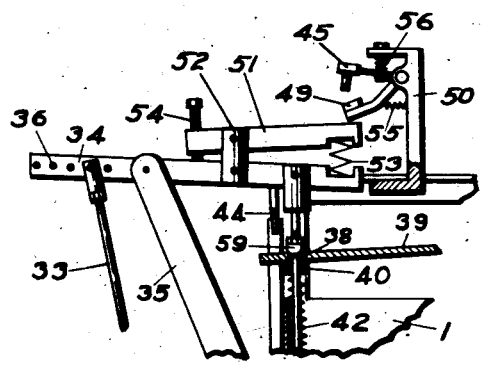
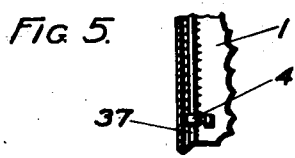
Inventor
EARL W. LITTLE
By Owen H. Spencer
Attorney Jan. 31, 1933.   E. W. LITTLE   1,895,577
AUTOMATIC WELDING MACHINE
Filed March 31, 1930   8 Sheets-Sheet 2

Inventor
Earl W. Little
By Owen H. Spencer
Attorney

Jan. 31, 1933. E. W. LITTLE 1,895,577
AUTOMATIC WELDING MACHINE
Filed March 31, 1930   8 Sheets-Sheet 3
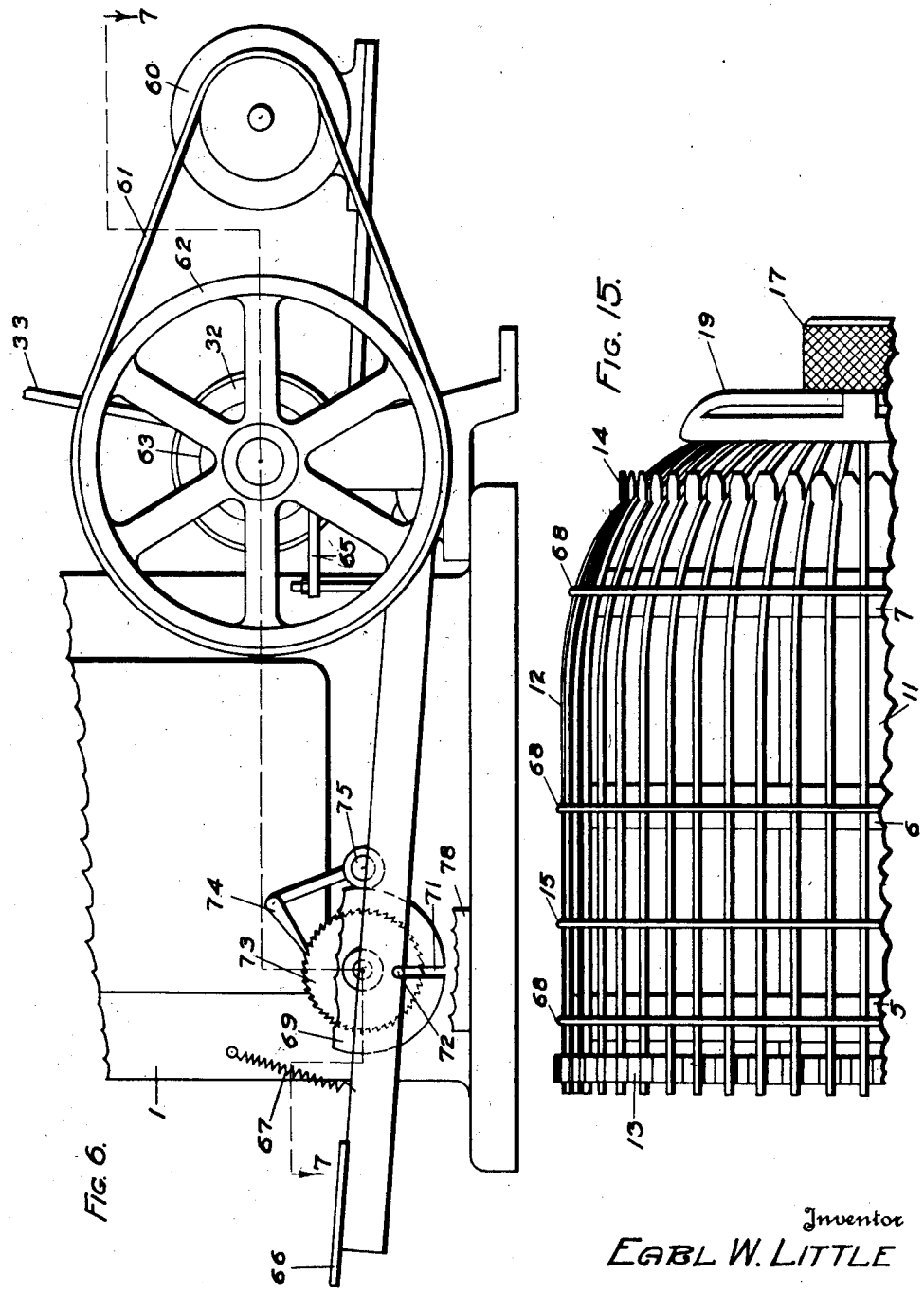

Jan. 31, 1933.    E. W. LITTLE    1,895,577
AUTOMATIC WELDING MACHINE
Filed March 31, 1930    8 Sheets-Sheet 4
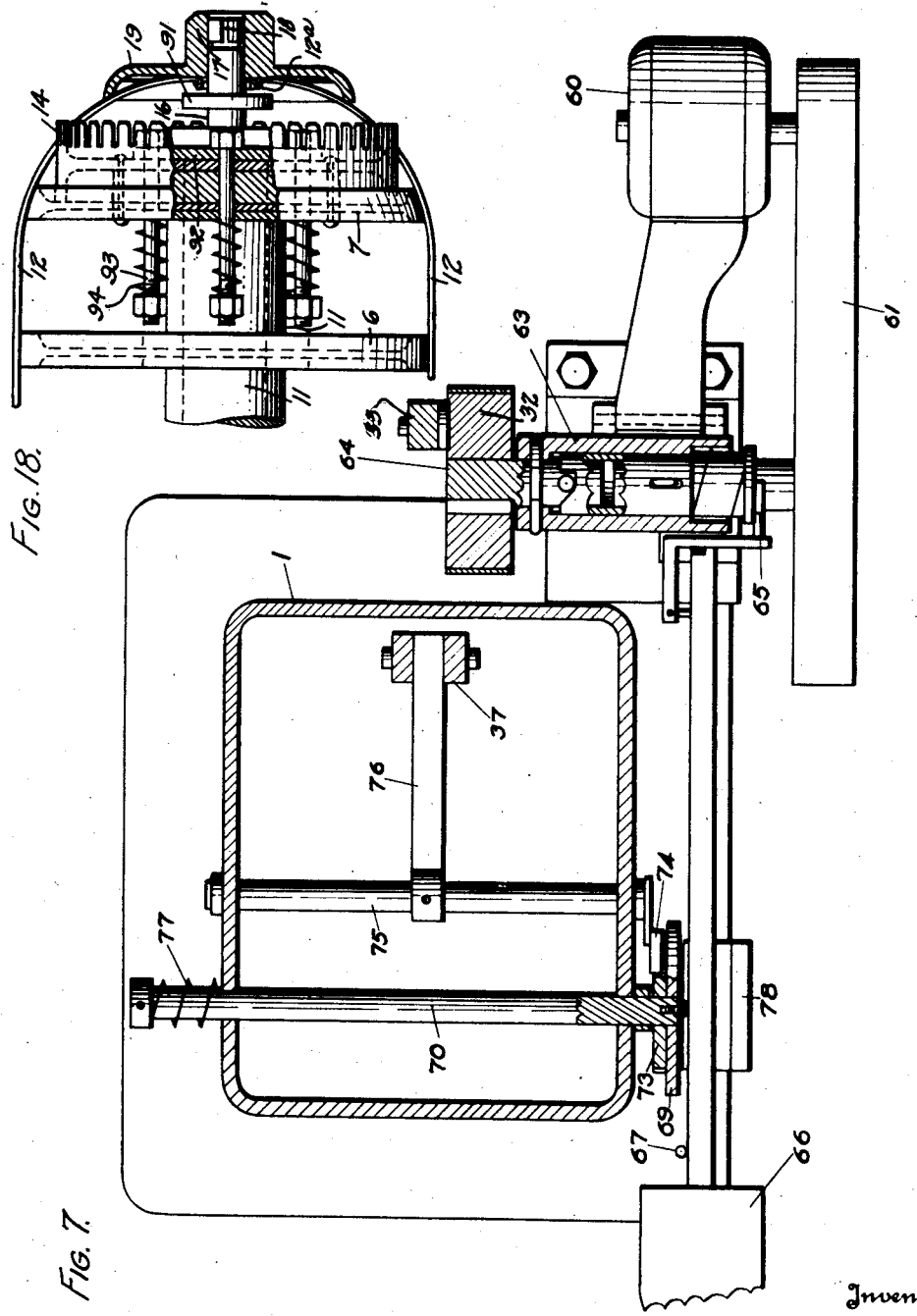
Inventor
EARL W. LITTLE
By Owen H. Spencer
Attorney Jan. 31, 1933.  E. W. LITTLE  1,895,577
AUTOMATIC WELDING MACHINE
Filed March 31, 1930  8 Sheets-Sheet 5
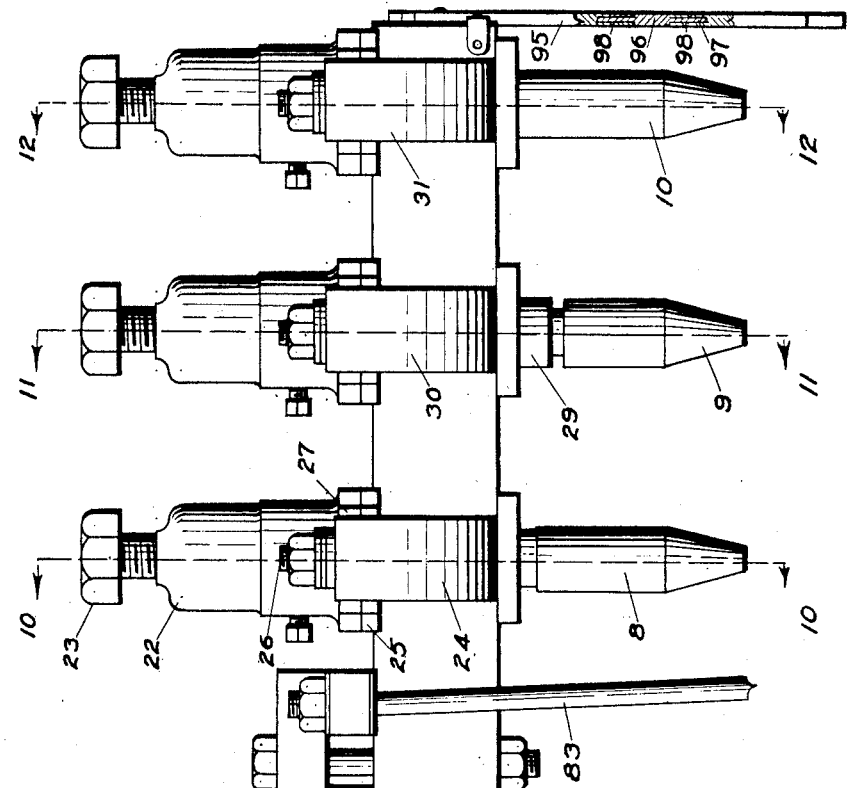
FIG. 8.
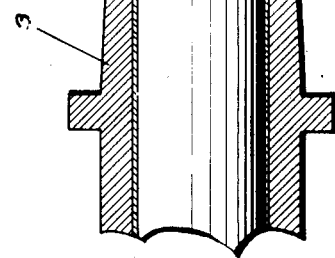
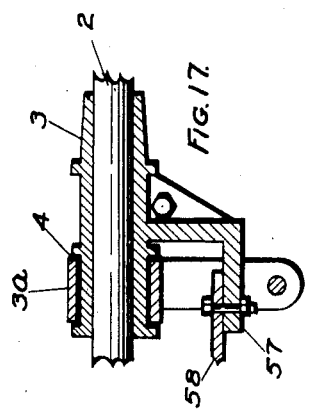
FIG. 17.
Inventor
EARL W. LITTLE
By Owen H. Spencer
Attorney Jan. 31, 1933.  E. W. LITTLE  1,895,577
AUTOMATIC WELDING MACHINE
Filed March 31, 1930   8 Sheets-Sheet 6
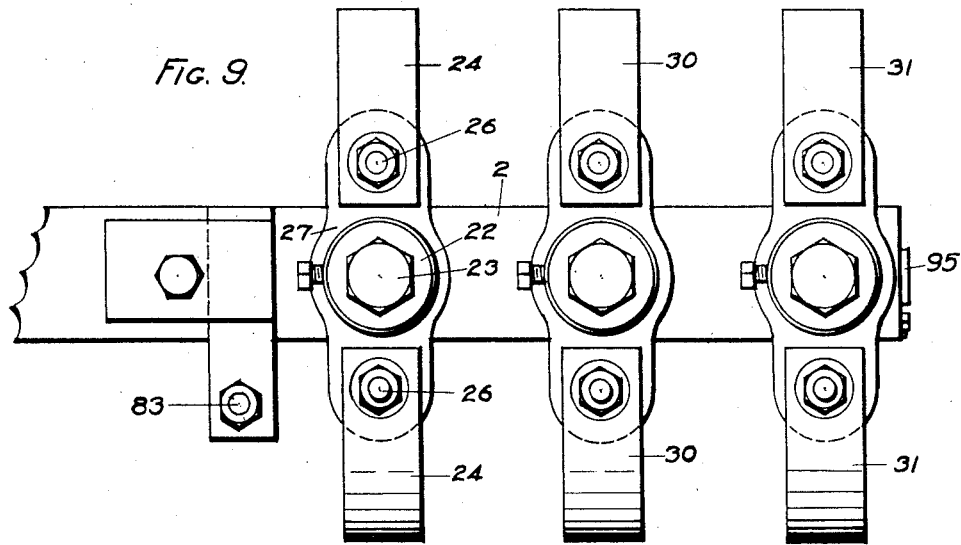
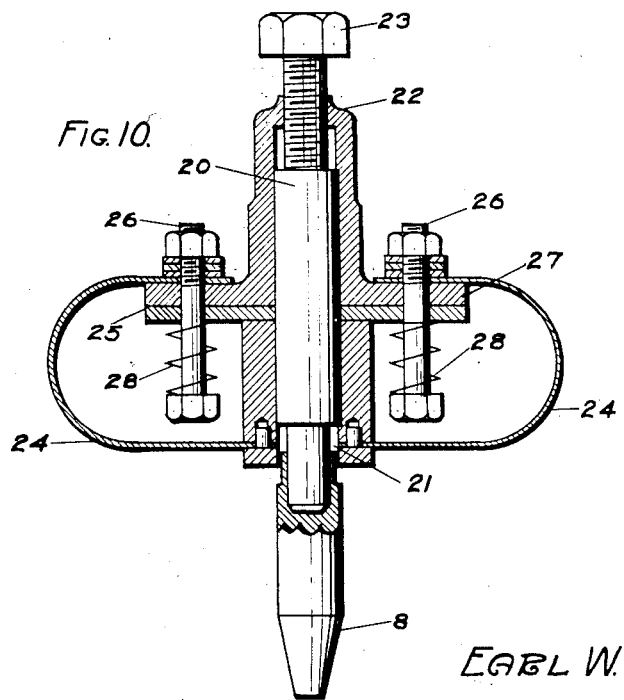
Inventor
EARL W. LITTLE
By Owen H. Spencer
Attorney

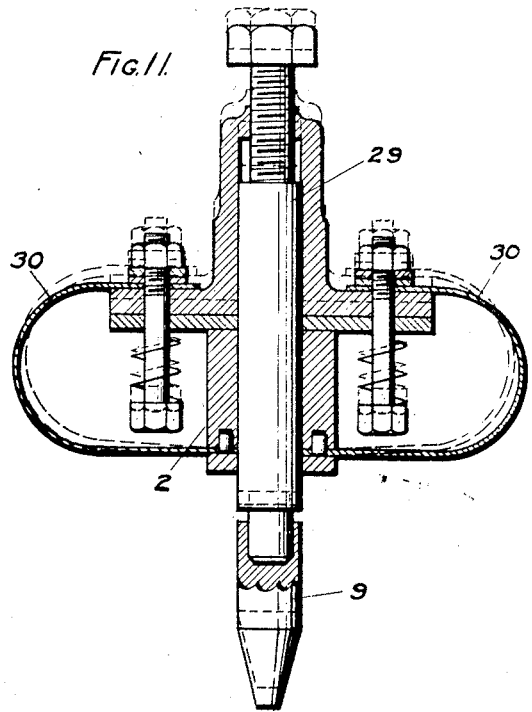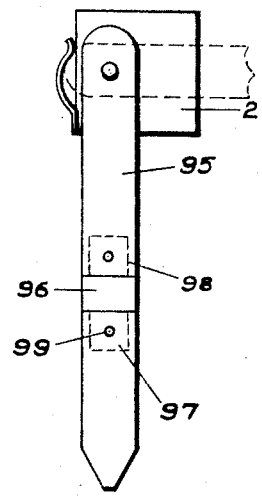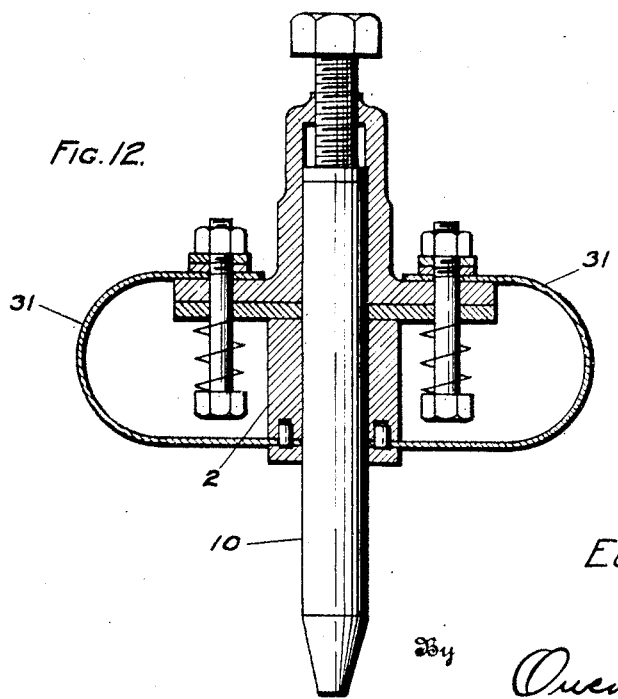

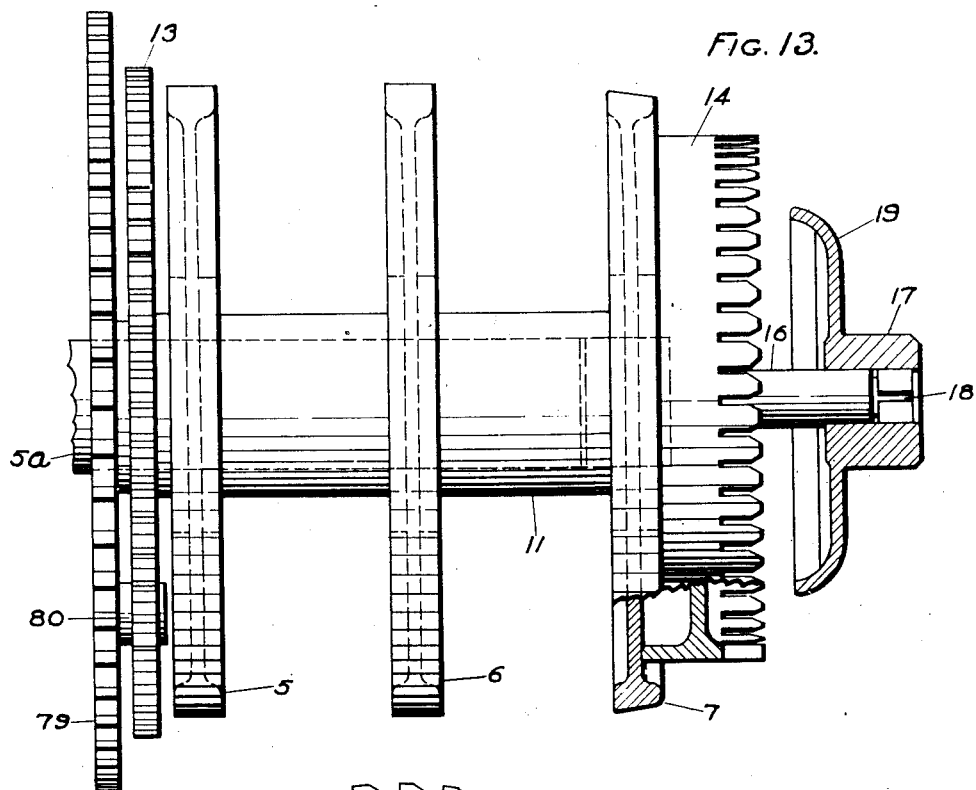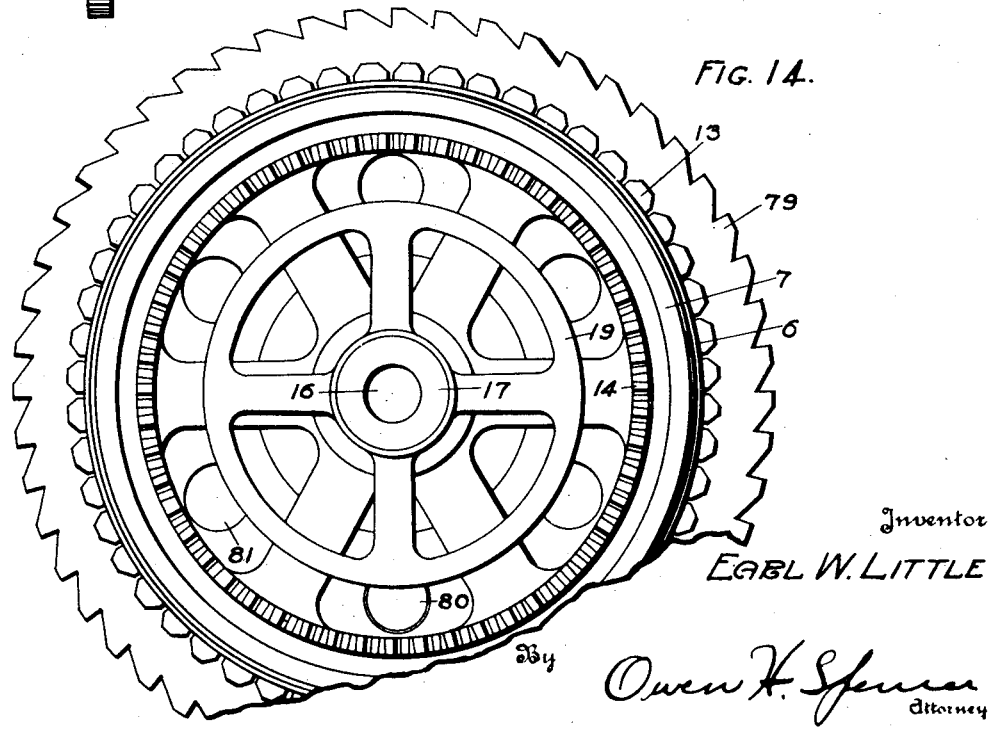

Patented Jan. 31, 1933

1,895,577

UNITED STATES PATENT OFFICE

EARL W. LITTLE, OF INDIANAPOLIS, INDIANA

AUTOMATIC WELDING MACHINE

Application filed March 31, 1930. Serial No. 440,295.

This invention relates to an automatic welding machine and is designed primarily for manufacturing wire cages and particularly bird cages although it may be used for various other purposes and one feature of the invention is the provision of electrodes so arranged that a plurality of welds may be made at the same time, at each operation of the machine.

A further feature of the invention is the provision of means for automatically and successively positioning the various strands of wire used for forming the body of the cage in position between the electrodes, whereby bands or the like may be welded to said wires.

A further feature of the invention is the provision of means for timing the operation of the mechanism.

A further feature of the invention is the provision of means for properly distributing or shunting the electric current when applied, whereby substantially the same voltage will be conveyed through the various electrodes from a single source.

A further feature of the invention is the provision of means for automatically stopping the welding operation when a prescribed number of welds have been made.

A further feature of the invention is the provision of means for manually stopping or restoring the operation of the welding mechanism at will.

A further feature of the invention is the provision of means for supporting the parts of the cage while being welded.

A further feature of the invention is the provision of means for retaining the shape of the wires forming the cage structure while being welded.

A further feature of the invention is the provision of means for introducing the electric current subsequent to making contact between the electrodes and the objects therebetween and while the electrodes are being held in contact under tension.

A further feature of the invention is in so constructing the electrodes that certain of them will have yielding contact with the objects to be welded, whereby said electrodes will adapt themselves to objects of uneven heights.

A further feature of the invention is in so arranging the welding parts of the device that they will be removed from the path of the cage structure and its support while being removed from or attached to the machine.

A further feature of the invention is the provision of means for removing the cage structure from the supporting element therefor after the welding operation has been completed.

A further feature of the invention is the provision of means for moving the wire to be welded toward the last previously welded wire prior to the succeeding welding operation, and serving to straighten bent wires.

Other objects and advantages will be hereinafter more fully set forth and pointed out in the accompanying specification.

In the accompanying drawings which are made a part of this application,

Figure 1 is a front elevation of the welding machine with the cage supporting means attached thereto.

Figure 2 is a rear elevation thereof.

Figure 5 is a detail sectional view as seen along line 5—5, Fig. 4.

Figure 6 is an enlarged detail side elevation of the lower portion of the machine.

Figure 7 is a sectional view thereof as seen along line 7—7, Fig. 6.

Figure 8 is an enlarged side elevation of the movable electrodes, parts being shown in section.

Figure 9 is a top plan view thereof.

Figure 10 is a transverse sectional view through one of the electrodes as seen along line 10—10, Fig. 8.

Figure 11 is a similar view through one of the electrodes as seen along line 11—11, Fig. 8.

Figure 12 is a similar view as seen along line 12—12, Fig. 8.

Figure 13 is an enlarged side elevation of the combined rotatable electrodes and cage shaper and support.

Figure 14 is an end elevation thereof.

Figure 15 is a fragmentary side elevation of the combined rotating electrodes and support with a cage structure in position thereon.

Figure 16 is an end elevation of one of the electrode carrying arms showing a spacer finger attached thereto.

Figure 17 is a sectional view through one of the electrode carrying arms, showing the manner of mounting the same to the welding machine, and, Figure 18 is an elevation, partly in section, of a cage releasing mechanism.

Figure 3:
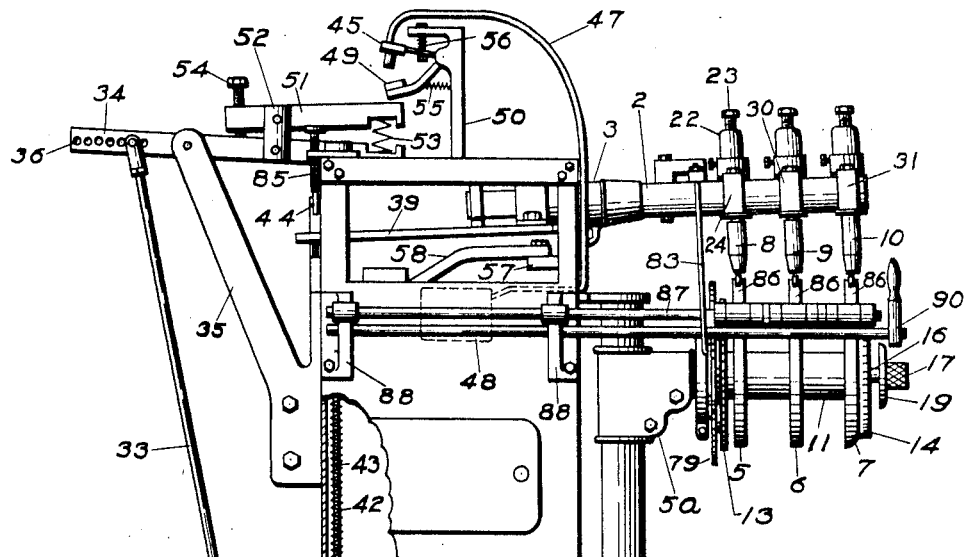
Figure 3 is a side elevation of the device with parts thereof broken away.
Figure 4:
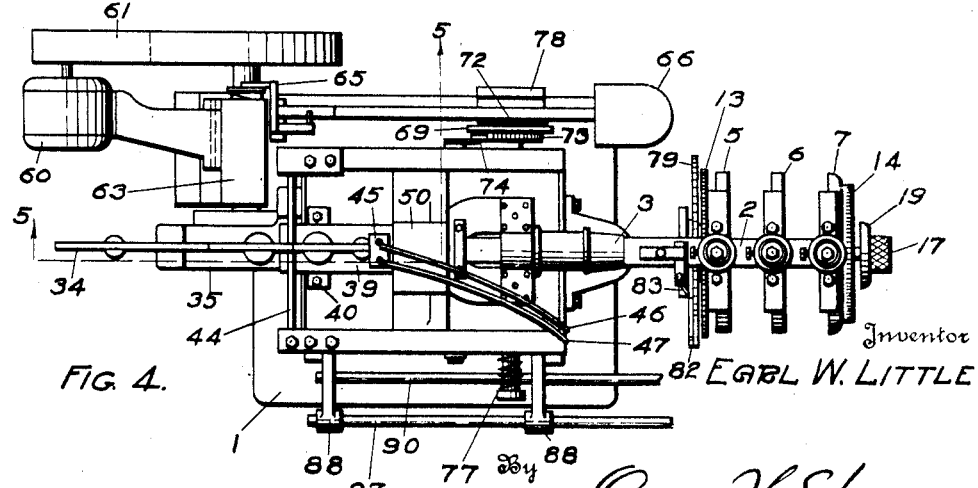
Figure 4 is a top plan view of the machine.

Referring to the drawings in which similar reference numerals designate corresponding parts throughout the several views, the numeral 1 designates the frame of the welding machine, which may be of the usual or any preferred construction, to the upper portion of which is pivotally attached an arm 2, said arm extending through a sleeve 3. Surrounding the sleeve 3 is a coupling 3a, which is pivotally attached to the frame 1, the coupling being insulated from the sleeve and parts attached thereto, by introducing any suitable insulating material 4 between said sleeve and coupling.

Associated with the pivoted arm 2, is a stationary arm 5a, on which is to be mounted circular ring-like electrodes 5, 6 and 7, with which cooperate movable electrodes 8, 9 and 10, respectively, carried by the movable arm 2. The electrodes 5, 6 and 7 are attached to a sleeve 11, which fits over the end of the stationary arm 5a and is rotatable thereon, so that the wires of a cage structure 12 (see Fig. 15) may be successively brought to position between the sets of electrodes. Associated with the rotating electrodes 5, 6 and 7, are notched guide members 13 and 14, which hold the longitudinal wires of the cage structure in spaced relation during the welding operation, said wires being held in assembled relation with the guide members by introducing any suitable encircling means as at 15, around the wires of the cage, after they have been properly engaged with the several notches of the guides.

The vertical wires of the cage structure 12 are assembled together at one end by attaching one end of the wires to a ring like member 12a and this assemblage is introduced over a shaft 16, projecting beyond the outermost electrode 7 and a collar 17 then introduced over the extreme outer end of said shaft 16 and secured thereto in any suitable manner, as by a bayonet socket 18. In order to hold the curved shape of the crown portion of the cage during the welding operation, a ring-like shaper 19 is formed on the collar 17, which presses against the crown forming wires, when the collar is secured to the shaft 16.

In order to prevent an excess of electricity to pass through any one of the electrodes 8, 9 and 10, the electrode 8 is attached to a shank 20 of relatively hard alloy, which extends vertically through an opening 21 in the arm 2, the upper end thereof entering a socket 22 above the arm 2, an adjusting screw 23 being threaded through the upper end of the socket for adjusting the length of the electrode.

The current is carried from the arm 2 through curved bands 24, into the socket 22 and thence downwardly through the shank 20 to the electrode proper 8 and by forming said bands 24 of comparatively thin metal, thus reducing the carrying capacity of the bands, and by constructing the shank 20 of relatively hard material, a sufficient resistance is set up to shunt a portion of the current around the electrode 8 and cause it to pass on towards the outer end of the arm 2. The socket 22 is adapted to move upwardly with the shank 20, when the electrode 8 is lowered into engagement with an object, thus slightly separating the socket 22 from the bar 25, on which it rests, so that but a very minor portion of the current will pass directly from the arm 2 to the shank 20, due partially to the loose fit of the shank within the oepning 21. The lower ends of the bands 24 are permanently fixed to the lower face of the arm 2, while the upper ends thereof are engaged by bolts 26, which pass downwardly through the flanges 27, of the socket and through the bar 25, springs 28 being introduced around said bolts between the heads thereof and the under face of the bar, so that when pressure is applied against the electrodes 8, 9 or 10, they may have vertical movement, both the bands 24 and springs 28 yielding sufficiently to permit the electrodes to adjust themselves to compensate for any inequality in the thickness of the metal at the welding points.

The construction of the electrode 9 and parts associated therewith, are similar to the electrode 8, except that the shank 29 is preferably constructed of an alloy of medium hardness and the bands 30 are made thicker than the bands 24, so that the electric current will flow more freely therethrough, while the electrode 10 is constructed, in its entirety of copper, with the bands 31 of the same relative thickness as the bands 30, so that the current will freely flow through the electrode 10 without being materially retarded.

By constructing the electrodes 8, 9 and 10 in the manner shown, practically the same amount of current is passed through the several electrodes, as the electrode 8, being nearest the source of current supply, will set up the greatest resistance and shunt the major supply of current towards the outer end of the arm 2. The strength of the current is necessarily somewhat depleted, incident to the supply taken up by the electrode 8, consequently the electrode 9 is arranged to set up less resistance than the electrode 8, but still has sufficient resistance to shunt a portion of the current to the electrode 10 to properly energize the same in proportion to the other electrodes, and thus prevent an oversupply or all the current passing through any one of the electrodes.

It will likewise be seen that in the event one or two of the electrodes encounter an object to be welded that is higher than that encountered by the rest of the electrodes, the bands and springs associated with such electrodes will yield sufficiently to permit all the electrodes to be lowered into engagement with their respective object to be welded, so that a perfect weld will be made at all points on the cage structure and without effecting the flow of current passing through the electrodes.

The arm 2 is rocked on its pivot to lower the electrodes carried thereby into operative position through the medium of a crank wheel 32, to which is attached a pitman 33, the upper end of the pitman being in turn attached to a lever 34, pivotally attached to a bracket 35, said lever having a plurality of openings 36 to provide an adjustable connection for the pitman. Attached to the lever 34, adjacent its inner end, is a rod 37, which passes downwardly through an opening 38 in the end of an actuating plate 39, the opposite end of which plate is attached to the inner end of he arm 2, so that when said plate is swung upwardly, the arm 2 will be swung downwardly. The rod 37 has a pair of cross arms 40 and 41 slidably mounted thereon and in spaced relation with each other, between the ends of which are placed compression springs 42, the cross arm 40 being located immediately beneath the actuating plate 39 while the cross arm 41 is adjustably attached to the rod 37 at a suitable distance below the plate 39, the cross arm 40 carrying guide rods 43, which retain the springs 42 in proper alinement.

With this construction, it will be seen that when the inner end of the lever 34 is raised, the rod 37 will likewise be raised and direct the tension of the springs 42 against the under face of the actuating plate 39, the continued compression of the springs serving to raise the outer end of said plate and lower the arm 2 until the electrodes thereon contact with an object to be welded, or until the plate strikes a stop 44, on parts of the frame 1, the springs 42 being under tension so long as the rod 37 is in elevated position, thereby providing a somewhat yielding connection between the electrodes, the tension of the springs, however, being sufficiently strong to form a perfect connection between the electrodes and the members therebetween.

As the inner end of the lever 34 is again lowered, a nut 59, threaded onto the rod 37, above the actuating plate 39, will strike the actuating plate and force the same downwardly, thereby elevating arm 2 and electrodes carried thereby and restoring them to their initial elevated positions, or to such a height that they will be out of the path of the cage structure and parts supporting the same, so that a cage structure and its supporting members may be quickly removed therefrom or mounted thereon without contacting with any of the electrodes carried by the arm 2. The elevation of the arm 2 is so timed with the completion of the welding operation, that the arm will be held in its upward position until the mechanism is again set in motion to perform another welding operation.

It is an object of the present invention to close the electrodes against the members to be welded before the current is turned into the electrodes and to this end a gap 45 is provided in the current conveying wires 46 and 47, the wire 46 extending from any source of supply to the gap 45 and the wire 47 from the gap to any suitable form of reduction coil 48. The gap 45 is closed by means of a switch 49, which is hinged to a standard 50, extending upwardly from the frame 1, the gap 45 being also pivoted to said standard, the switch being moved upwardly into contact with the gap 45 by a detent 51, pivotally attached to a standard 52 on the lever 34. In order to provide a yielding and at the same time provide a prolonged and delayed contact between the detent 51 and the switch 49, a coil spring 53 is entered between the end of the detent 51 and the lever 34, the time of contact between said detent and switch being regulated by means of an adjusting screw 54. The switch 49 is normally withdrawn from contact with the gap 45 by means of a spring 55, while the gap 45 is provided with a compression spring 56, which permits slight yielding movement of the gap when contacted by the switch, the closing of the switch with the gap being accomplished subsequent to the contact being formed between the electrodes, thereby guarding against the current being carried through one electrode before the complete closing of the other electrodes. The switch 49 is not instantly released as the lever 34 starts to descend as the compressed springs 53 and 56 will retain the switch in engagement with the gap for a limited time after the lever starts to descend.

The curent passes from the coil 48 into the arm 2, by extending an arm 57, downwardly from the arm 2, with which cooperates one end of a brush 58, the opposite end of the brush being anchored to parts of the frame 1 and connected in any suitable manner with the coil.

The crank wheel 32 is rotated through the medium of a motor 60, which, through the medium of a belt 61 and pulley 62, drives a conventional clutch mechanism 63, which may be moved into or out of operative connection with the shaft 64 of the crank wheel by means of a lever 65. The lever 65 is operated to move the clutch mechanism 63 into operative position, by means of a foot operated treadle 66, one end of which is pivoted to parts of the frame 1, while the opposite end thereof is extended forwardly of the frame 1 and is normally held in elevated position by means of a spring 67, the clutch mechanism being out of gear when the treadle is in elevated position.

In assembling cages of this nature, bands 68 or the like are extended around the assembled wires 12 and a weld formed between the bands and each of the wires and to this end, the cage structure and parts carrying the same are rotated one complete revolution and to accomplish this result automatically, a disc 69 (See Fig. 6) is mounted on a shaft 70, extending transversely through the frame 1, the diameter of said disc being such that it will make one complete revolution with each revolution of the members carrying the cage structure, and by providing a slot 71 in the disc 69, into which takes a pin 72, carried by the treadle 66, the treadle will be permitted to swing upwardly, due to the tension of the spring 67, and disconnect the clutch mechanism 63 from the crank wheel 32 and stop further operation of the welding machine, or until a new cage structure is positioned to be welded. When the welding machine is in operation, the pin 72 is riding on the peripheral edge of the disc 69, thereby holding the clutch mechanism in operative position until the disc has made a complete revolution and the pin 72 again brought into registration with the slot 71. The disc 69 is automatically and intermittently rotated by mounting upon the shaft 70 a ratchet 73, with which cooperates a pawl 74, mounted upon a shaft 75, said pawl being operated by means of a lever 76, the free end of which is attached to the lower end of the rod 37. A longitudinal tension is directed against the shaft 70, by means of a spring 77, thereby preventing excess rotation of the disc 69 after each propulsion thereof by the pawl 74, and also permitting the disc and ratchet to be manually rotated to bring the same to the proper initial starting point, when the operation of the machine, for any reason, has been manually interrupted.

By attaching the lever 76 to the lower end of the rod 37, the pawl 74 will be operated and impart rotating action to the ratchet 73 and disc 69 with each vertical movement of the rod 37, so that the disc will be rotated a prescribed distance with each lowering of the electrodes carried by the arm 2. Under normal conditions the machine will continue to operate until the disc 69 has made one complete revolution, but if it is desired to stop the operation of the machine before the disc has made a complete revolution, lateral outward pressure is applied to the treadle 66, which will remove the pin 72 out of the path of the disc 69, whereupon the spring 67 will elevate the treadle 66 and stop further operation of the welding machine, a guard 78 being provided for limiting the lateral movement of the treadle.

In order to rotate the combined rotating electrodes 5, 6 and 7, the distance from one of the wires of the cage structure 12 to the next wire thereof, a ratchet 79 is rotatably mounted on the arm 5a and is removably engaged with the associated electrodes 5, 6 and 7, and the guide members 13 and 14, by means of a pin 80, which extends from the ratchet 79 and through one of a plurality of openings 81 in the web of the guide member 13. The ratchet 79 is intermittently operated by means of a pawl mechanism 82, which is oscillated by the movement of the arm 2 by means of a pitman 83, one end of which is attached to the arm 2 and insulated therefrom and the opposite end to the pawl mechanism 82, consequently, with each elevation of the arm 2, the electrodes and cage structure 12 mounted thereon, will be rotated a prescribed distance, or the distance from one wire of the cage structure to the next.

The stroke or downward movement of the arm 2 may be regulated by pivotally mounting the stop 44 on the frame 1, one end of the stop having a spring 84 between it and parts of the frame 1 and a set screw 85 for directing downward pressure against the opposite end of said stop for positioning the stop at different heights above said actuating plate 39.

The bands 68 are held in proper alinement during the welding operation by means of guide members 86, which are carried by a shaft 87, mounted in supports 88, extending from the frame 1, said guide members having weights 89 thereon for holding them in engagement with the bands 68. The guide members 86 are elevated, as when a new band is being placed in position, or when the welding operation has been completed, by means of a lever controlled structure 90.

In order to provide means for conveniently loosening the cage structure, after the welding operation has been completed, the shaft 16 is provided with a collar 91 against which the ring 12a is rested when assembled on the supporting frame formed by the electrodes 5, 6 and 7 and the guide members 13 and 14, the inner end of the shaft 16 having a flange 92, which is connected to the hub of the electrode 7 by means of elongated bolts 93, around each of which is disposed a spring 94, the tension of which hold the shaft more or less firmly against the hub of said electrode. In removing the cage structure from the supporting element, the supporting element and cage structure thereon are first removed from the arm 5a and the collar 17 then removed. The supporting element is then inserted over a shaft (not shown) with force so that the end of such shaft will deliver a blow against the end of the shaft 16, which will result in forcing the shaft 16 outwardly, carrying the cage structure therewith. This will leave the cage structure free to be easily lifted from the supporting element.

In welding a band around a cage structure of this nature, it has been found that the continued expansion in the band, caused incident to the various welding operations, will leave the band in a distorted condition and forming an imperfect cage. To overcome this objectionable feature, a spacing finger 95 is pivotally attached to the outer end of the arm 2, the free end of which is tapered so that it will readily take between the respective wires of the cage structure 12, as the arm 2 is lowered to make a weld. The width of the finger is slightly greater than the normal distance between said wires, so that the wire to be welded will be moved toward the last previously welded wire, whereby when the weld is made and the band is again expanded, such expansion will position the last welded wire the proper distance from the previously welded wire. In other words, the wire to be welded is moved toward the previously welded wire a distance equal to the expansion of the band, when the weld is made. This action takes up the expansion of the band throughout its length and prevents buckling of the band at any point and producing a perfect cage.

It will also be seen that in the event any of the wires of the cage structure 12 are bent out of shape, the finger 95 will straighten the same before the weld is made.

The lower end of the finger 95 is insulated from the upper portion thereof by forming the finger in two sections and connecting them together with any suitable insulating material, such as a section of wood 96, each end thereof preferably having an extension 97 thereon, which fit in sockets 98 in the adjacent ends of the sections of the finger and any suitable means may be provided for holding the extensions in said sockets, such as pins 99. If desired, a finger may be placed on the arm 2, adjacent each electrode carried thereby.

In operation, the cage structure 12, comprising the strands of wire and the ring 12a, to which one end of the wires are attached, is slipped over the frame constituted by the ring-like electrodes 5, 6 and 7 and the guide members 13 and 14, with the ring 12a resting against the collar 91 and the wires entered in the notches of the guide members 13 and 14, when the retaining member 15 is introduced over the wires of the cage for holding them seated in their respective notches and the collar 17 engaged with the outer end of the shaft 16 for locking the cage structure in engagement with the supporting member.

The supporting structure is then introduced over the arm 5a and moved inwardly until the pin 80 enters one of the openings 81. The band forming wires 68 are then positioned to be welded to the wires of the cage 12, with the guide members 86 resting thereon, there being one of such wires 68 over each electrode 5, 6 and 7.

Downward pressure is then applied to the outer end of the treadle 66 until the pin 72 is released from the slot 71, this movement of the treadle 66 permitting the clutch mechanism 63 to move to operative position and set up operation of the parts of the welding machine. As soon as the disc 69 has started to rotate, pressure is released from the treadle and the pin 72 permitted to engage the peripheral edge of the disc, where it rides until the disc has made a complete revolution and the slot 71 again brought into registration with the pin, when the pin will again move upwardly in the slot and stop further operation of the welding machine.

When the machine is automatically stopped, the parts are in the relative positions shown in Fig. 3, so that when the crank wheel 32 starts to rotate, the pitman 33 will draw the outer end of the lever 34 downwardly and the inner end thereof upwardly. This movement exerts an upward pull on the rod 37 and directs the tension of the springs 42 against the free end of the actuating plate 39, which causes the arm 2 to descend and force the electrodes 8, 9 and 10 against the interposed band forming wires 68 and the wires of the cage 12. In the event of an uneveness in any of the wires at the points engaged by the electrodes 8, 9 or 10, the bands and springs associated with the respective electrodes will expand and permit the electrodes to adjust themselves to the surfaces with which they contact.

The operation of seating the electrodes is completed before the crank wheel 32 has completed its revolution, so that the rod 37 may continue to move upwardly, thus directing the end of the detent 51 against the switch 49 and force the same against the gap 45 and close the circuit through the wires 46 and 47, which action will energize the electrodes and form a weld at the several points engaged by the electrodes. As the crank wheel 32 continues to rotate, the rod 37 will again move downwardly and direct pressure against the upper face of the actuating plate 39, through the medium of the nut 59, thereby raising the arm 2 and moving the electrodes carried thereby from the path of the cage structure and parts carrying the same.

With each raising and lowering of the rod 37, the lever 76 will be correspondingly raised and lowered for rocking the shaft 70, thereby imparting action to the pawl 74, which will intermittently rotate the ratchet 73 and disc 69, associated therewith, this action continuing until the disc has made a complete revolution. If for any reason it is desired to stop the operation of the welding machine, before the disc 69 has made a complete revolution, the outer end of the treadle 66 is to be swung outwardly laterally a sufficient distance to remove the pin 72 from the peripheral edge of the disc 69. The disc 69 may be manually rotated to return the parts to the proper starting point if desired.

It will likewise be seen that the electrodes 5, 6 and 7, carrying the cage structure 12, will be intermittently rotated incident to the action of the pawl mechanism 82 against the ratchet 79, the electrodes being stepped the distance from one wire to the next of the cage 12, with each elevation of the arm 2, the action of the ratchet mechanism 79 and the ratchet mechanism 73 and disc 69 being in timed relation with each other so that the electrodes 5, 6 and 7, will have made a complete revolution with each complete revolution of the disc 69.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

What I claim is:

1. In an automatic welding machine, a movable arm, a plurality of electrodes carried by said arm, a plurality of rotatably mounted electrodes in the path of said arm carried electrodes, and means for intermittently rotating said latter electrodes incident to the raising and lowering of said arm.

2. In an automatic welding machine, a plurality of rotating electrodes adapted to form a support for a cage structure, means for rotating said electrodes, means for directing an electric current through parts of said cage structure into said electrodes for welding the cage structure together, and means for moving the next succeeding part of said cage structure to be welded toward the part of said cage structure last previously welded for compensating for expansion.

3. In a welding machine, a movable arm, a plurality of electrodes carried by said arm, a stationary arm cooperating with said movable arm rotating electrodes carried by said stationary arm for receiving and supporting a cage structure, means for raising and lowering said movable arm, means operated by the movement of said movable arm for intermittently rotating the cage supporting electrodes and the cage thereon, and means for automatically stopping the welding operation on the completion of a complete revolution of the cage supporting electrodes.

4. In a welding machine, a movable element, a plurality of electrodes carried thereby, and means for yieldingly attaching said electrodes to said element, whereby said electrodes may adjust themselves to uneven surfaces contacted thereby comprising sockets in which said electrodes are mounted, yielding bands between said movable element and sockets, and spring controlled means for directing downward movement to said sockets.

5. In a welding machine, a movable element, electrodes carried thereby, means for yieldingly attaching said electrodes to said movable element, comprising sockets in which said electrodes are mounted, yielding bands between said movable element and sockets, and spring controlled means for directing downward movement to said sockets, and rotating cage carrying electrodes cooperating with the first mentioned electrodes.

6. In a welding machine, a movable arm, electrodes positioned at intervals in the length of said movable arm, sockets mounted on said arm, and shanks carrying said electrodes, the upper ends of which enter said sockets, the conductivity of said shanks being increased from one end of the movable element toward the other, whereby a current will be shunted outwardly on said element and substantially the same electrical energy supplied to each electrode.

7. In a welding machine, a stationary arm, electrodes rotatable on said arm and shaped to form a cage support, a movable arm, electrodes carried thereby adapted to cooperate with the rotatable electrodes for forming welds, and means operated by the movement of said movable arm for intermittently rotating the rotatable electrodes.

8. In a welding machine for welding cages or the like, a cage supporting frame on which a cage is placed while being welded, a shaft at one end of said supporting frame to which one end of the cage is secured, and means for yieldingly attaching said shaft to said supporting frame, whereby when a blow is delivered to said shaft the cage structure will be released from said support.

9. In a welding machine, circular electrodes for supporting a cage structure while being welded, a movable arm, electrodes carried thereby, and means on said arm for engaging the wires of said cage as said arm is lowered for moving the contacted wires laterally prior to the wires being welded.

10. In a welding machine, an assemblage of electrodes for receiving a cage structure to be welded and holding the wires thereof in spaced relation, an electrode carrying arm adapted to be raised and lowered, a two part finger carried by said arm and movable between pairs of the wires of the cage structure when the arm is lowered for moving the contacted wires laterally prior to welding the same, and insulating material connecting the parts of the finger.

In testimony whereof, I have hereunto set my hand on this the 26th day of March, 1930.

EARL W. LITTLE.